(12) United States Patent
Chapman et al.

(10) Patent No.: US 11,467,295 B2
(45) Date of Patent: Oct. 11, 2022

(54) GAMMA DETECTION SYSTEM INCORPORATING ELECTRONIC PROBE COLLIMATION

(71) Applicant: Ohio State Innovation Foundation, Columbus, OH (US)

(72) Inventors: Gregg Chapman, Columbus, OH (US); Robert Lee, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 224 days.

(21) Appl. No.: 16/904,126

(22) Filed: Jun. 17, 2020

(65) Prior Publication Data

US 2020/0400844 A1    Dec. 24, 2020

Related U.S. Application Data

(60) Provisional application No. 62/862,984, filed on Jun. 18, 2019.

(51) Int. Cl.
| | | |
|---|---|---|
| *G01T 7/00* | (2006.01) | |
| *G01T 1/24* | (2006.01) | |
| *G01T 1/20* | (2006.01) | |
| *G01T 1/161* | (2006.01) | |
| *G01T 1/164* | (2006.01) | |

(52) U.S. Cl.
CPC .............. *G01T 7/005* (2013.01); *G01T 1/161* (2013.01); *G01T 1/1647* (2013.01); *G01T 1/20* (2013.01); *G01T 1/24* (2013.01)

(58) Field of Classification Search
CPC ....... G01T 7/005; G01T 1/161; G01T 1/1647; G01T 1/20; G01T 1/24
See application file for complete search history.

(56) References Cited

U.S. PATENT DOCUMENTS

| | | | |
|---|---|---|---|
| 4,782,840 A | 11/1988 | Martin, Jr. et al. | |
| 4,801,803 A | 1/1989 | Denen et al. | |
| 4,889,991 A * | 12/1989 | Ramsey | A61B 6/4258 |
| | | | 250/363.01 |
| 5,441,050 A | 8/1995 | Thurston et al. | |
| 5,482,040 A | 1/1996 | Martin, Jr. | |
| 5,814,295 A | 9/1998 | Martin, Jr. et al. | |
| 6,144,876 A * | 11/2000 | Bouton | A61B 6/4258 |
| | | | 600/436 |

\* cited by examiner

*Primary Examiner* — David P Porta
*Assistant Examiner* — Meenakshi S Sahu
(74) *Attorney, Agent, or Firm* — Meunier Carlin & Curfman LLC

(57) ABSTRACT

An instrument and software methodology to detect a radioactive source and incorporates the following:
1) two radiation detectors in a co-axial configuration, housed in a handheld probe, and
2) a gamma detection control unit executing software algorithms to limit the functional field of view to the front aspect of the probe, vary the depth and width of the field of view to provide collimation without the use of metallic shielding, and allowing the instrument to measure the distance to the radiation source.

6 Claims, 3 Drawing Sheets

GAMMA DETECTION SYSTEM INCORPORATING ELECTRONIC PROBE COLLIMATION

CROSS-REFERENCE TO RELATED APPLICATIONS

This application claims benefit of provisional application 62/862,984 filed Jun. 18, 2019.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

Intraoperative detection of radiolabeled cancer has become a standard of care for some forms of cancer surgery. Gamma detection of radiolabeled tumors has a distinct advantage over other methods of cancer detection that cannot be measured through more than a few millimeters of tissue, such as fluorescence. While commercially available gamma probes can localize the radiolabeled target in two dimensions, they do not provide any indication of depth. Most commercially available gamma detection probes are designed for use with low energy radioisotopes. Many radiotracers in clinical use exhibit positron emission, which ultimately decays into two 511 kilo-electron volts (KeV), high-energy gamma emissions. Gamma detection probes capable of capturing this energy require heavy side shielding to block off-axis radiation, making them both large and cumbersome for intraoperative use. Moreover, minimally invasive surgical procedures performed either laparoscopically or robotically, are rapidly replacing open procedures in many areas of surgical oncology.

To detect high-energy radioisotopes intraoperatively through a standard 12 millimeter Trocar port, the gamma detection probe must be designed with increased sensitivity at high energy, and incorporate an alternative to the heavy metal shielding.

BRIEF SUMMARY OF THE INVENTION

The present invention describes a gamma detection system, which includes a hand-held probe and central controller containing software algorithms specific to the application. This design implements a collimated field of view without the use of heavy metal shielding, and detects the depth of a radiation source embedded in tissue or other medium. The invention is differentiated from prior art in that only two detectors are required to implement a field of view on the frontal aspect of the hand-held probe. Moreover, the methodology relies on the separation of the two detectors both located along a longitudinal extent of the probe, as opposed to differences in sensitivity due to the shielding effect of surrounding material or additional detectors. Because the preferred geometry of the invention aligns two gamma radiation detectors on the long axis of the hand-held probe, the diameter of the applied part can be reduced to less than 12 millimeters. Because the front detector is not recessed in heavy metal shielding, the distance from the detector to the source is reduced, increasing the sensitivity of the probe. The two-detector probe without shielding, its use in detecting gamma rays, and the resulting system are disclosed herein.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION OF INVENTION

Figure 1:
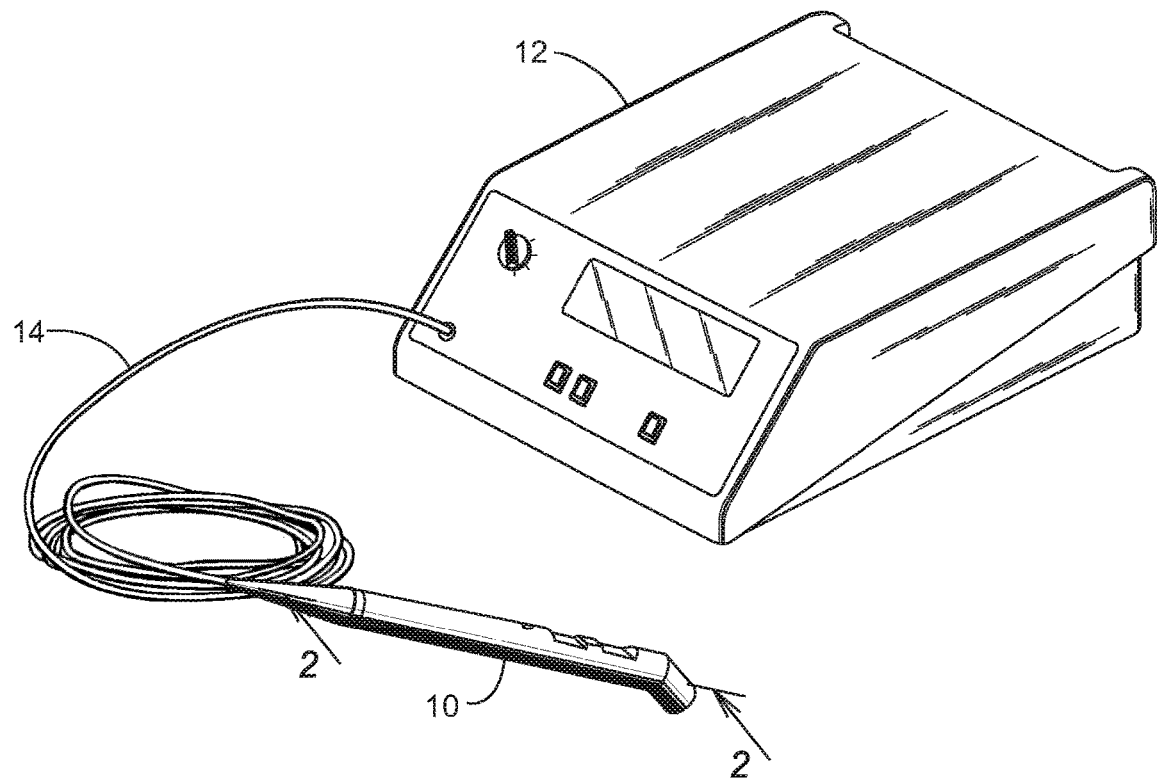
FIG. 1 illustrates the preferred embodiment of the gamma detection control unit and hand-held probe.

In FIG. 1, a hand-held probe, 10, is attached to a console, 12, via a cable, 14, such as is described in representative U.S. Pat. Nos. 4,801,803, 4,889,991, 5,441,050, 6,144,876, and others. Except as is described below, the operation of such probes and console pairs of the disclosed probe/console is like that described in the cited patents, which are expressly incorporated herein by reference.

Figure 2:
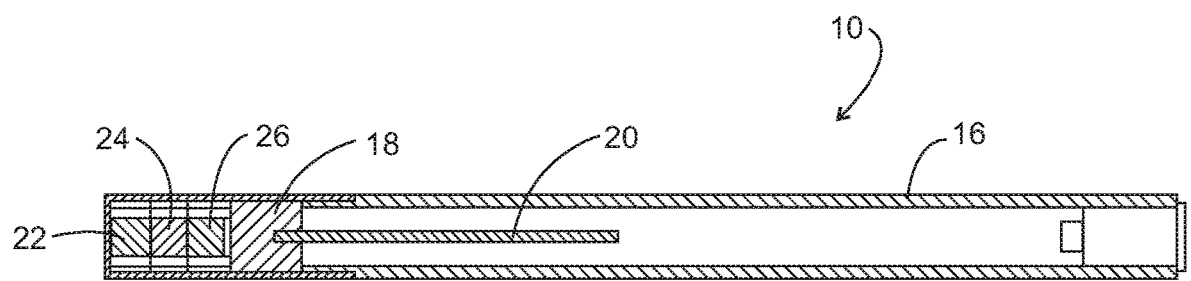
FIG. 2 shows the elements and configuration of the two-detector hand-held probe design.

FIG. 2 displays probe 10 in cross-section along line 2-2 of FIG. 1. Probe 10 has an annular metal housing, 16, made of steel in which is housed a preamplifier(s), 18, in electrical connection with console 12 via a cable, 20. A pair of crystals, 20 and 22, such as CZT (cadmium zinc telluride alloy), which is a direct bandgap semi-conductor useful in detecting sources of radiation. The two crystals are separated by a non-conducting spacer, 24, such as, for example, a polytetrafluoroethylene fluoropolymer (Teflon® brand, The Chemours Company FC, LLC, Wilmington, Del.). The preferred crystals operate effectively in detecting $^{123}$I, $^{124}$I, $^{125}$I, and radionuclide sources with energies above 510 KeV.

The ratio of the count rates from the detector pair can be compared to an arbitrary limiting value to define the extent of the allowable field of view. If the count rate ratio exceeds the set limit, the gamma detection system reports zero for the count rate. This is functionally equivalent to 100% shielding.

The resulting field of view is an approximately spherical volume directly in front of the probe tip, and symmetric about the axis through the detector pair. By varying the limiting value for the counting threshold, the volume of the field of view can be changed. The greater the limiting value, the smaller the field of view. By eliminating side and rear shielding in this way, the size of the gamma detection probe can be reduced in diameter. A probe of 10-12 millimeters in diameter is ideal for head and neck surgery, laparoscopic and robotic surgery, pediatric surgery, and small animal models used in oncology research.

Figure 3:
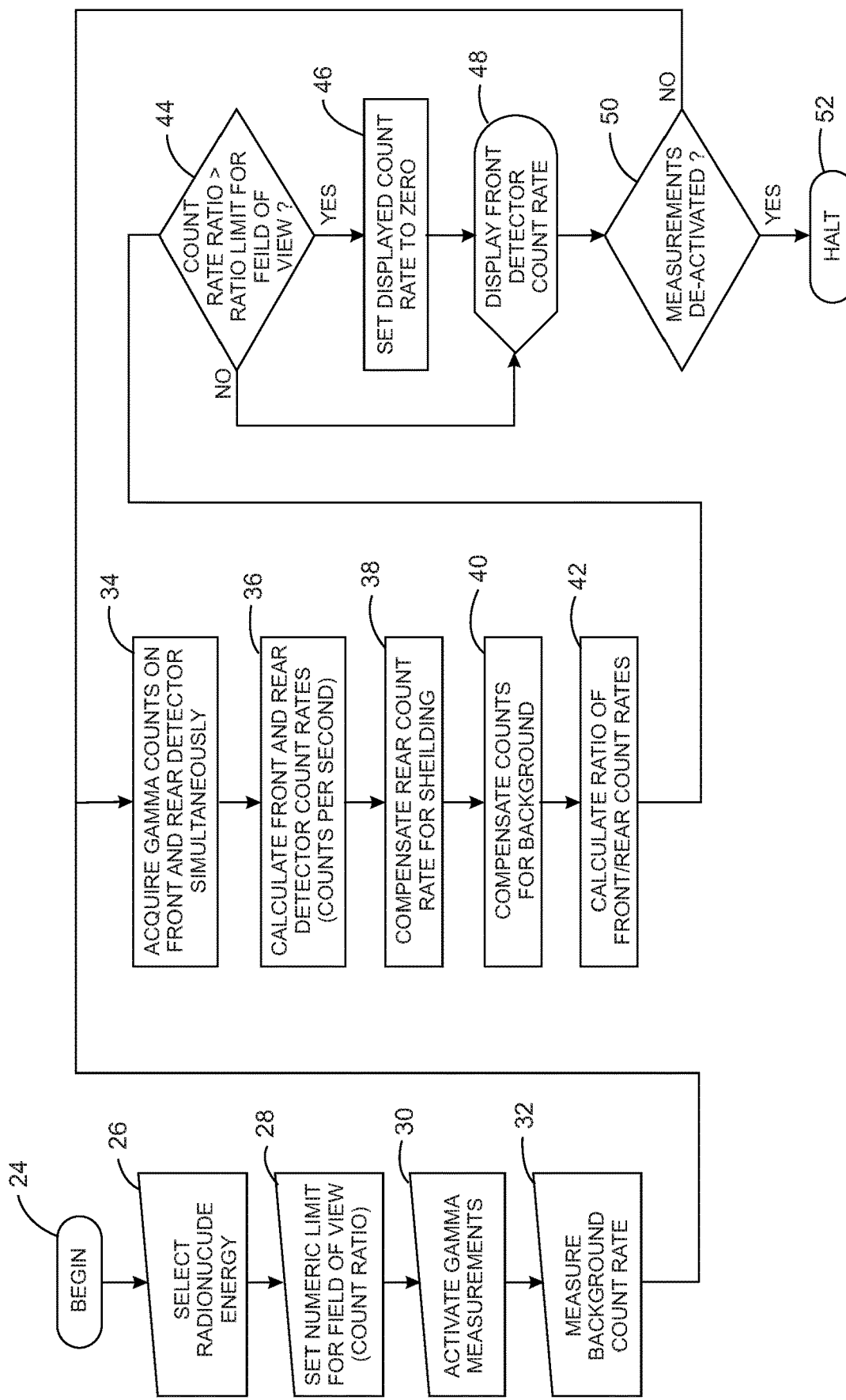
FIG. 3 illustrates the software algorithm to limit the field of view of a gamma radiation detector probe incorporating two detection elements (front and rear)
Figure 4:
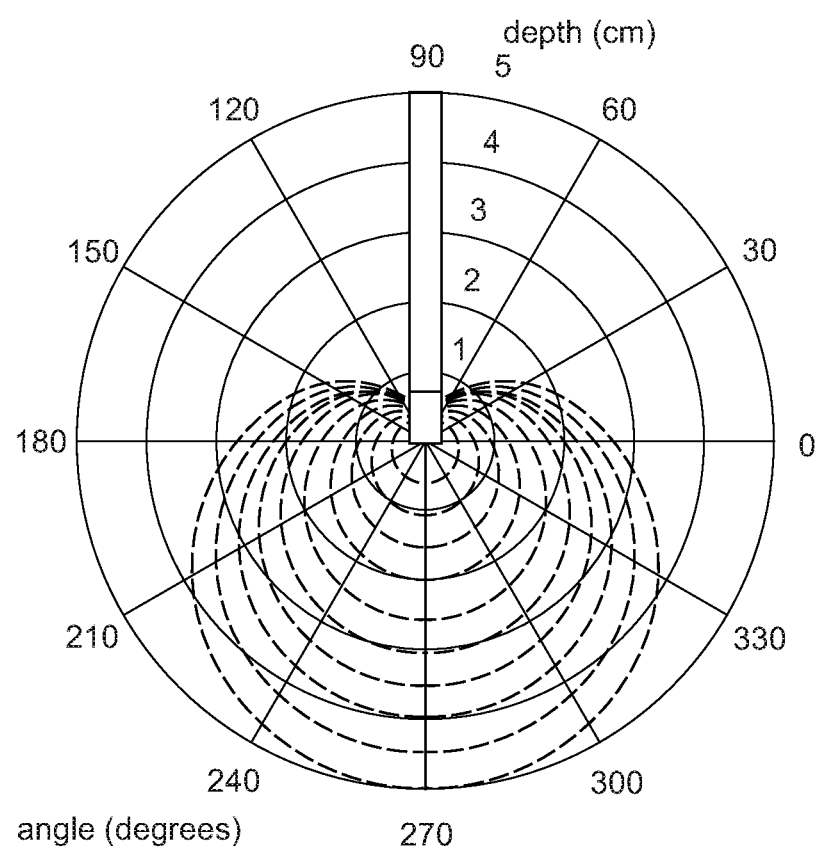
FIG. 4 shows the geometric distribution of the electronically collimated field of view for limiting values of 1.445 to 7.000.

FIG. 3 illustrates the software algorithm to limit the field of view of a gamma radiation detector probe incorporating two detection elements (front and rear). The software commences at Begin in step 24 and proceeds to select the energy of the radionuclide of interest in step 26, which is entered into console 12. The program continues to step 28 where the numeric limit for the field of view or count ratio is set in the console. The probe is active for gamma measurements in next step 30. In next step 32 background counts are measured. In next step 34 the gamma counts are acquired for each of the two detector crystals. Then in next step 36, the number of counts detected by each crystal is calculated in the console. The shielding effect of the forward crystal on the rear crystal is compensated in next step 38. In next step 40, background counts are compensated. In step 42, the ratio of front/rear detector count rates are determined.

The software then proceeds to step 44 where the ratio in step 42 is compared to the ratio limit for the field of view used to determine whether the ratio limit has been exceeded. If it has been exceeded, the software proceeds to step 46 where the displayed count rate is set to zero and the front detector count rate displayed by the console. If not, the software skips step 46 and proceeds to step 48, which also is the next step after step 46. In next step 50, the software looks to see whether count measurements have been de-activated. If the count measurements have been de-activate, the software proceeds to halt step 52. If the count measurements in step 50 have not been de-activated, the software returns to step 34.

Commercially available probes incorporate side and rear shielding of sufficient thickness to reduce off-axis radiation to a small percentage of the incident radiation flux. This feature is optimized for the energy of a specific radionuclide. Because electronic collimation is a function of count rates, and not energy dependent, this methodology of limiting the field of view is effective for any radionuclide greater than approximately 100 kilo-electron-volts (KeV) and less than 1.20 MeV. At lower energies, the shielding effect of the front detector is too great to receive accurate count rates from the rear detector. At energies greater than 1.22 MeV, pair production adversely effects the count rate measurement of the probe.

The extent of the field of view may be limited by disabling the visual and audio feedback to the end user whenever the ratio of the count rates from two co-axial detectors falls below a pre-defined value. The field of view may be enlarged or reduced in volume by changing the ratiometric value at which counting feedback to the user is enabled. In the preferred implementation, the separation between the two co-axial detectors is fixed by placing a material of low gamma absorption, such as Teflon® (E.I. DuPont de Nemours and Company) between the two detectors, as described above. If the radiation source is assumed to be a point source, the count rate ratio of the two detectors can be measured and calculated according to the inverse squared relationship:

$$\frac{N_F}{N_R} = \left(\frac{(d+x)}{d}\right)^2,$$

where $N_F$ is the number of counts received by the detector, $N_R$ is the number of counts received by the detector, d is the distance from the detector to the source, and x the separation of the two detectors.

For a fixed value of the count rate ratio, the distribution of the field of view can be defined as, $$\frac{\cos\phi + \sqrt{(\sin\phi)^2 + \frac{N_F}{N_R}}}{\frac{N_F}{N_R} - 1}$$

where $\phi$ is the angle from the central axis of the two detectors. The field of view for count ratios from 1.445 (largest) to 7.00 (smallest) are illustrated in FIG. 5.

The extent of the field of view is known to vary with background radioactivity. For this reason, the gamma detection system for the present invention must include calibration data for the probe to compensate the field of view for the measured background count. The background count is measured by the clinician at a location that would represent the average background count in the tissue of interest. The background radiation is assumed to be uniform in the application. Background counts are eliminated from the detector count rates using statistical criteria calculated from the background measurement.

The count rate of the rear detector must be corrected for the shielding effect of the front detector. The shielding effect is constant at a specific gamma energy, but varies significantly with the energy of the radionuclide. For this reason, the radionuclide measured form the target source must be known a priori. Once the energy is defined, the gamma detection system can compensate for the count reduction caused by the shielding. At gamma energies lower than 100 KeV, this compensation exceeds 50 percent of the count rate, making electrical collimation impractical. Electronic collimation is used for radionuclide energies ranging from greater than 100 KeV to 1.2 MeV.

The disclosed probe may find use in locating gamma rays emitted by a radionuclide attached to a biologically active group—that is, a group that performs a desired function/interaction in vivo, whether as a preferential locator (e.g., an antibody, fragment, peptide, aptamer, etc.), a nanoparticle, an enzyme, lectin, or other substance of diagnostic or therapeutic significance. Such preferential locators have shown value against TAG (tumor associated glycoprotein), an anti-TAG locator, when labeled with a radionuclide detectable by the disclosed probe in vivo, such as disclosed in, for example, U.S. Pat. Nos. 4,782,840, 5,482,040, and 5,814,295.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. All citations referred herein are expressly incorporated herein by reference.

The invention claimed is:

1. An elongate probe for detecting a source of radiation, comprising an elongate annular housing having a forward end and a rear end and in which are disposed:
   (a) a pair of co-axial radiation detecting elements separated by a material of low gamma absorption, wherein the pair of co-axial radiation detecting elements are in electrical connection with a console housing a software algorithm applying the inverse square law to count rate differences between the pair of co-axial radiation detecting elements to limit the field of view of the pair of co-axial radiation detecting elements, according to the following equation:

$$\frac{N_F}{N_R} = \left(\frac{(d+x)}{d}\right)^2,$$

where $N_F$ is the number of counts received by the forward radiation detecting element, $N_R$ is the number of counts received by the rear radiation detecting element, d is the distance from the forward radiation detecting element to the source of radiation, and x the separation distance between the pair of co-axial radiation detecting elements; and
   (b) one or more preamplifiers located adjacent and rearward of the pair of co-axial radiation detecting elements and in electrical connection therewith; the elongate probe requiring no side shielding, but being electrically collimated for any source of radiation ranging from 100 KeV to 1 MeV.

2. The elongate probe of claim 1, which is calibrated for each specific source of radiation to provide a correction factor for the shielding effect of the forward radiation detecting elements on the rear radiation detecting element.

3. The elongate probe of claim 1, which is calibrated for each specific source.

4. The elongate probe of claim 1, which is calibrated for background radiation.

5. The elongate probe of claim 1, wherein a distribution of the field of view can be defined as, $$\frac{\cos\phi + \sqrt{(\sin\phi)^2 + \frac{N_F}{N_R}}}{\frac{N_F}{N_R} - 1}$$

where $N_F$ is the number of counts received by the forward radiation detecting element, $N_R$ is the number of counts received by the rear radiation detecting element, and φ is the angle from the central axis of the pair of co-axial radiation detecting elements.

6. The elongate probe of claim 1, wherein the pair of co-axial radiation detecting elements comprise one or more of a semiconductor, a diode, or a scintillation element.

* * * * *